(12) United States Patent
Kaneko et al.

(10) Patent No.: US 11,346,736 B2
(45) Date of Patent: May 31, 2022

(54) PRESSURE GAUGE CONFIGURED TO FACILITATE BATTERY REPLACEMENT

(71) Applicant: NAGANO KEIKI CO., LTD., Tokyo (JP)

(72) Inventors: Hiroyuki Kaneko, Tokyo (JP); Takayuki Mizukoshi, Tokyo (JP); Shota Shioiri, Tokyo (JP); Masaki Yanagisawa, Tokyo (JP); Hidenori Saka, Osaka (JP); Yutaku Hashimoto, Osaka (JP)

(73) Assignee: NAGANO KEIKI CO., LTD., Tokyo (JP)

( * ) Notice: Subject to any disclaimer, the term of this patent is extended or adjusted under 35 U.S.C. 154(b) by 78 days.

(21) Appl. No.: 17/082,204

(22) Filed: Oct. 28, 2020

(65) Prior Publication Data

US 2021/0131896 A1 May 6, 2021

(30) Foreign Application Priority Data

Oct. 31, 2019 (JP) .............................. JP2019-198560

(51) Int. Cl.
| | |
|---|---|
| *G01L 7/04* | (2006.01) |
| *G01L 9/00* | (2006.01) |
| *G01L 19/00* | (2006.01) |
| *G01L 19/08* | (2006.01) |
| *G01L 19/14* | (2006.01) |

(52) U.S. Cl.
CPC ............ *G01L 7/043* (2013.01); *G01L 9/0051* (2013.01); *G01L 19/0007* (2013.01); *G01L 19/086* (2013.01); *G01L 19/14* (2013.01)

(58) Field of Classification Search
None
See application file for complete search history.

(56) References Cited

U.S. PATENT DOCUMENTS

| | | | | |
|---|---|---|---|---|
| 3,828,611 A | * | 8/1974 | Shamlian | ................ B63C 11/02 73/431 |
| 3,888,127 A | * | 6/1975 | Shamlian | ............... G04B 19/30 73/431 |

(Continued)

FOREIGN PATENT DOCUMENTS

| | | |
|---|---|---|
| JP | H10-288560 A | 10/1998 |
| JP | 2006-510035 | 3/2006 |

(Continued)

OTHER PUBLICATIONS

European Search Report dated Mar. 22, 2021, 5 pages.
Japanese Notice of Allowance dated Mar. 22, 2022, 1 page.

*Primary Examiner* — Peter J Macchiarolo
*Assistant Examiner* — Jermaine L Jenkins
(74) *Attorney, Agent, or Firm* — Rankin, Hill & Clark LLP (57) ABSTRACT

A pressure gauge includes an introduction member, a connection member, a bourdon tube, a pointer, a dial plate, a detector, and an information communication unit. A battery installed in the information communication unit is disposed between a circuit board and a lid. The information communication unit is inserted in a through hole of the dial plate to be disposed astride between a front surface and a rear surface of the dial plate and the lid is disposed on a side of the information communication unit close to the front surface of the dial plate.

9 Claims, 7 Drawing Sheets

(56) References Cited

U.S. PATENT DOCUMENTS

| | | | |
|---|---|---|---|
| 7,716,990 B1 | 5/2010 | Sacerio | |
| 2004/0113813 A1* | 6/2004 | Henson | G01L 7/043 340/870.07 |
| 2007/0251688 A1* | 11/2007 | Davis | E21B 47/07 166/250.01 |
| 2012/0227662 A1* | 9/2012 | Coombs | G01L 19/10 116/271 |
| 2018/0348075 A1 | 12/2018 | Rubinstein et al. | |

FOREIGN PATENT DOCUMENTS

| | | |
|---|---|---|
| JP | 2007-240385 A | 9/2007 |
| JP | 2014-167432 A | 9/2014 |
| WO | 2004/053450 A1 | 6/2004 |
| WO | 2016/060987 A1 | 4/2016 |
| WO | 2017/195251 A1 | 11/2017 |

\* cited by examiner

PRESSURE GAUGE CONFIGURED TO FACILITATE BATTERY REPLACEMENT

The entire disclosure of Japanese Patent Application No. 2019-198560 filed Oct. 31, 2019 is expressly incorporated by reference herein.

TECHNICAL FIELD

The present invention relates to a pressure gauge.

BACKGROUND ART

A bourdon-tube pressure gauge equipped with a built-in pressure sensor has been known (for instance, Patent Literature 1: JP 2006-510035 A).

A bourdon-tube pressure gauge of Patent Literature 1 includes a battery for driving a pressure sensor, a wireless transmitter, etc. This eliminates the necessity of externally supplying power to the pressure gauge of Patent Literature 1.

However, in the pressure gauge of Patent Literature 1, the above battery is disposed between a movement, which is configured to transfer a displacement of the bourdon tube to a pointer, and a circuit board. In this case, the battery cannot be changed unless a front cover and a dial surface are removed and, further, the movement is removed. Therefore, an operation for battery change is time- and effort-consuming.

SUMMARY OF THE INVENTION

An object of the invention is to provide a pressure gauge configured to facilitate battery replacement.

According to an aspect of the invention, a pressure gauge includes: an introduction member having a fluid introduction hole into which a to-be-measured fluid is introduced; a connection member provided with a fluid flow hole being in communication with the fluid introduction hole; a bourdon tube attached to the connection member to be in communication with the fluid flow hole; a pointer configured to rotate in conjunction with a displacement of a distal end portion of the bourdon tube; a dial plate having a front surface on which a scale to be pointed by the pointer is displayed and having a through hole penetrating from the front surface to a rear surface; a detector configured to detect a pressure of the to-be-measured fluid and attached to the connection member; and an information communication unit in which a circuit board electrically connected to the detector and a battery are installed, the information communication unit including a bottomed cylindrical unit body and a lid covering an opening of the unit body, in which the battery is disposed between the circuit board and the lid, the information communication unit is inserted in the through hole to be disposed astride between the front surface and the rear surface of the dial plate, and the lid is disposed on a side of the unit body close to the front surface of the dial plate.

In the aspect of the invention, the battery is disposed between the lid and the circuit board in the information communication unit. Further, the information communication unit is inserted in the through hole of the dial plate to lie astride between the front surface and the rear surface of the dial plate and the lid is disposed on the side of the unit body close to the front surface of the dial plate. This eliminates the necessity of removing the dial plate, a mechanism for rotating and the pointer, etc. for the battery replacement, so that the battery replacement can be facilitated.

It is preferable that the pressure gauge according to the above aspect further includes a case including a bottomed cylindrical case body and a cover covering an opening of the case body, the case housing therein the connection member, the bourdon tube, the pointer, the dial plate, the detector, and the information communication unit, in which the lid is disposed facing the cover.

In this configuration, it is only necessary to remove the cover from the case body and remove the lid from the unit body in order to replace the battery installed in the information communication unit. Accordingly, the battery replacement can be facilitated.

It is preferable that the pressure gauge according to the above aspect further includes a case including a bottomed cylindrical case body and a cover covering an opening of the case body, the case housing therein the connection member, the bourdon tube, the pointer, the dial plate, the detector, and the information communication unit, in which the cover has a hole at a position corresponding to the information communication unit.

In this configuration, it is only necessary to remove the lid through the hole to replace the battery installed in the information communication unit. Therefore, the battery replacement can be facilitated.

In the pressure gauge according to the above aspect, it is preferable that the information communication unit is disposed in a manner to partially project outside the case through the hole, and the lid is disposed on an external side of the case.

In this configuration, the lid is disposed on an external side of the case, so that it is not necessary to remove the cover from the case body for the battery replacement. Accordingly, the battery replacement can be facilitated.

In the pressure gauge according to the above aspect, it is preferable that the information communication unit further includes an antenna provided at the circuit board, and the antenna is disposed at a position where at least a part of the antenna is not overlaid with the battery as seen from a direction orthogonal to the dial plate.

In this configuration, in sending or receiving an electric wave to or from an external device through the antenna, the battery is not disposed at least at a part of an electric wave transmission path. This allows for restraining interference of the battery with the electric wave to improve a sending/receiving sensitivity of the antenna to the electric wave.

In the pressure gauge according to the above aspect, it is preferable that the connection member includes a step to fit a shape of the unit body.

In this configuration, since the unit body can be housed in the step of the connection member, an inner space of the case can be effectively used. Therefore, the case can be reduced in size.

In the pressure gauge according to the above aspect, it is preferable that the connection member is in a form of a block and has a first attachment side surface disposed along a direction orthogonal to the dial plate and a second attachment side surface disposed along the direction orthogonal to the dial plate and opposite the first attachment side surface, the bourdon tube is attached to the first attachment side surface of the connection member, and the detector is attached to the second attachment side surface of the connection member.

In this configuration, the detector including the sensor element is attached directly to the connection member. Accordingly, since a housing portion or the like for housing the detector is not required, the inner space of the case can be effectively used. In addition, since the detector is attached to the second attachment side surface opposite the first attachment side surface attached to the bourdon tube, a space where the bourdon tube is not disposed within the case can be effectively used. Therefore, the case can be reduced in size.

In the pressure gauge according to the above aspect, it is preferable that the detector includes a sensor element configured to detect the pressure of the to-be-measured fluid and a communication tube through which the sensor element and the fluid flow hole are in communication with each other, the connection member and the communication tube are each made of a metal, and the communication tube and the second attachment side surface are welded to each other.

In this configuration, the communication tube is bonded to the connection member and the sensor element is in communication with the connection member through the communication tube. Accordingly, a bonding point between the communication tube and the connection member can thus be distant from the sensor element, heat of welding for bonding the communication tube to the connection member can be restrained from being transferred to the sensor element. Therefore, an influence of the welding on the sensor element can be reduced.

It is preferable that the pressure gauge of the above aspect further includes a pointer transfer mechanism configured to transfer the displacement of the distal end portion of the bourdon tube to the pointer, and the detector is disposed at a position where the detector does not interfere with the pointer transfer mechanism.

In this configuration, since the detector is disposed at a position where the detector does not interfere with the pointer transfer mechanism, the inner space of the case can be effectively used and the case can be reduced in size.

DESCRIPTION OF EMBODIMENT

Description will be made on a pressure gauge 1 of an exemplary embodiment of the invention with reference to the drawings.

Figure 1:
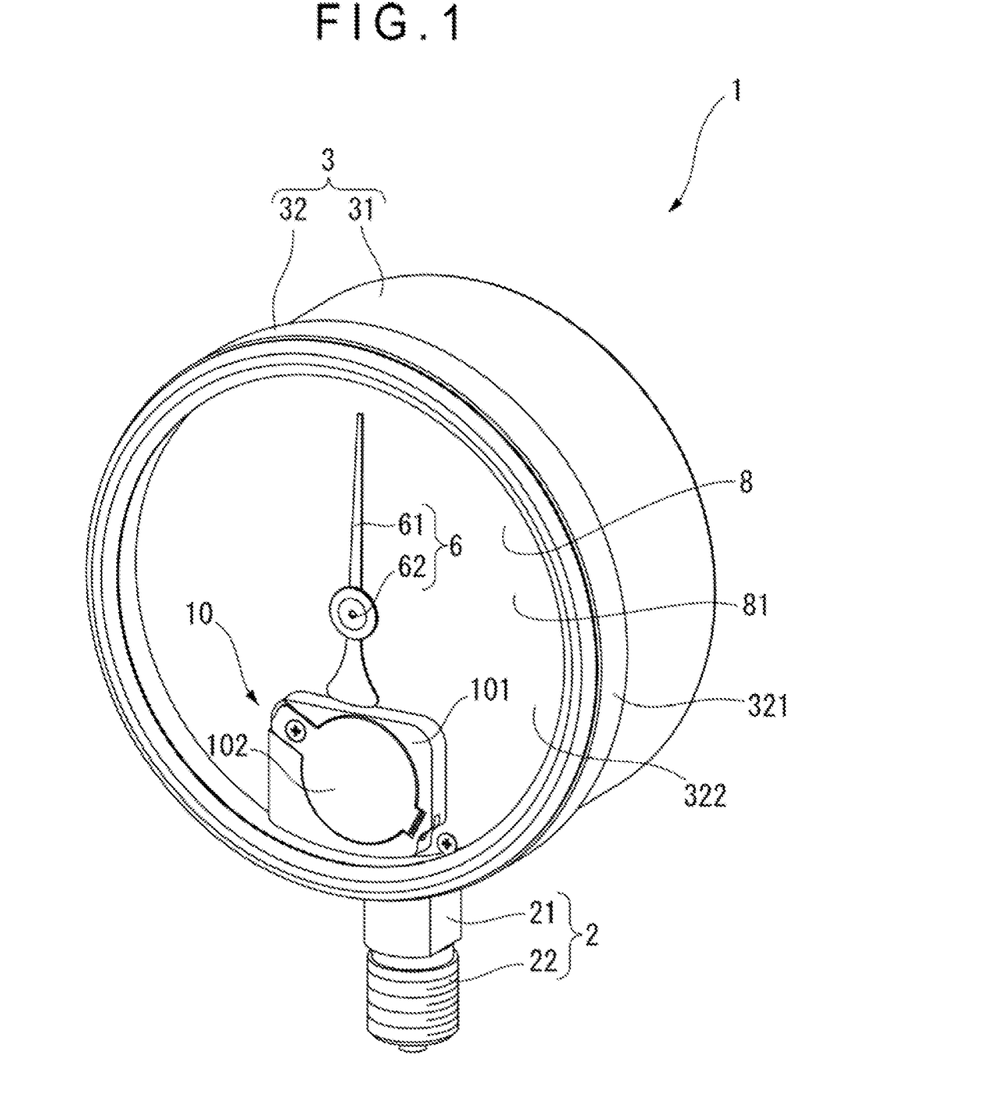
FIG. 1 is a perspective view of an overall configuration of a pressure gauge according to an exemplary embodiment of the invention.
Figure 2:
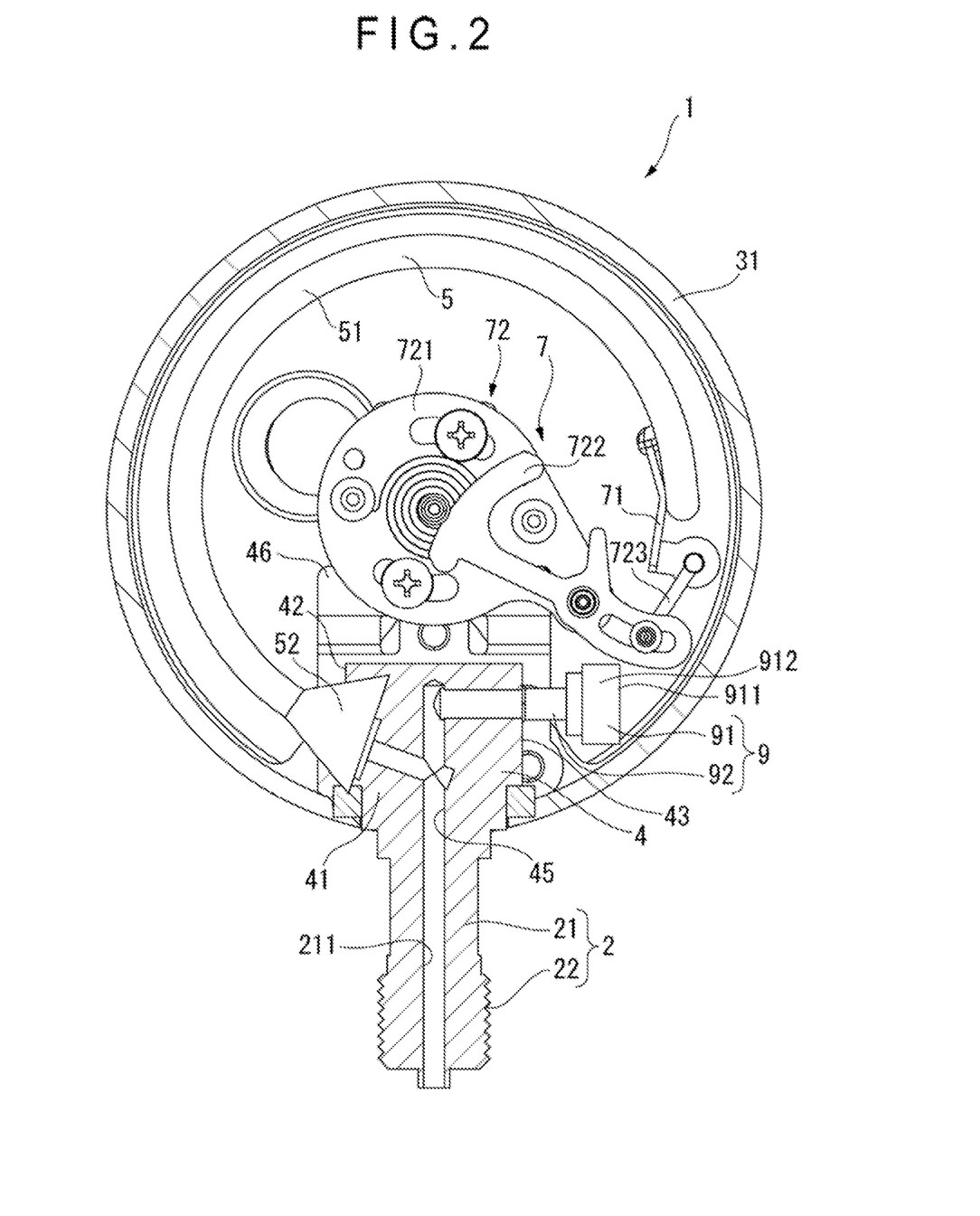
FIG. 2 is a front view of an overall configuration of an inner structure of the pressure gauge.
Figure 3:
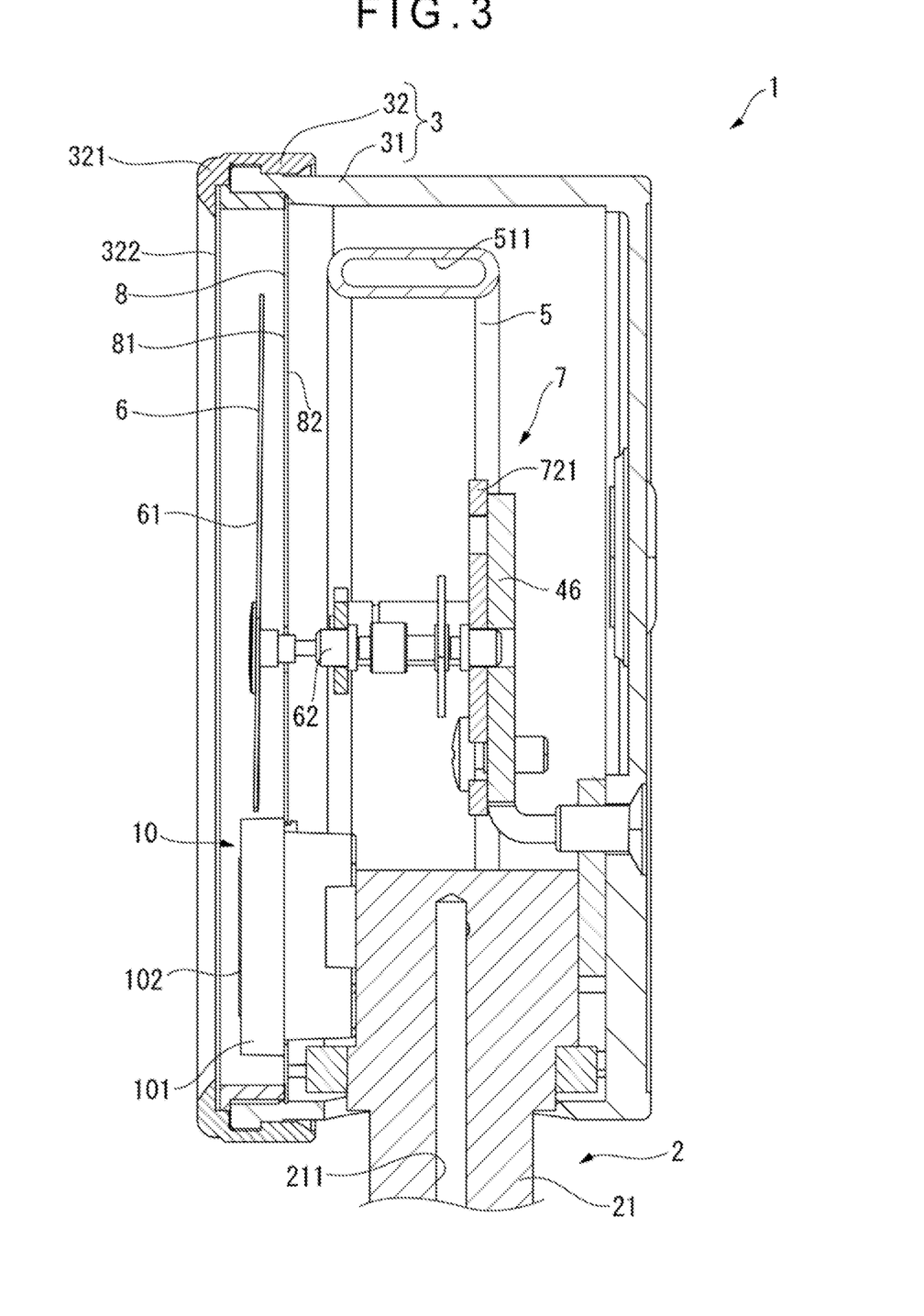
FIG. 3 is a side cross-sectional view of the overall configuration of the inner structure of the pressure gauge.
Figure 4:
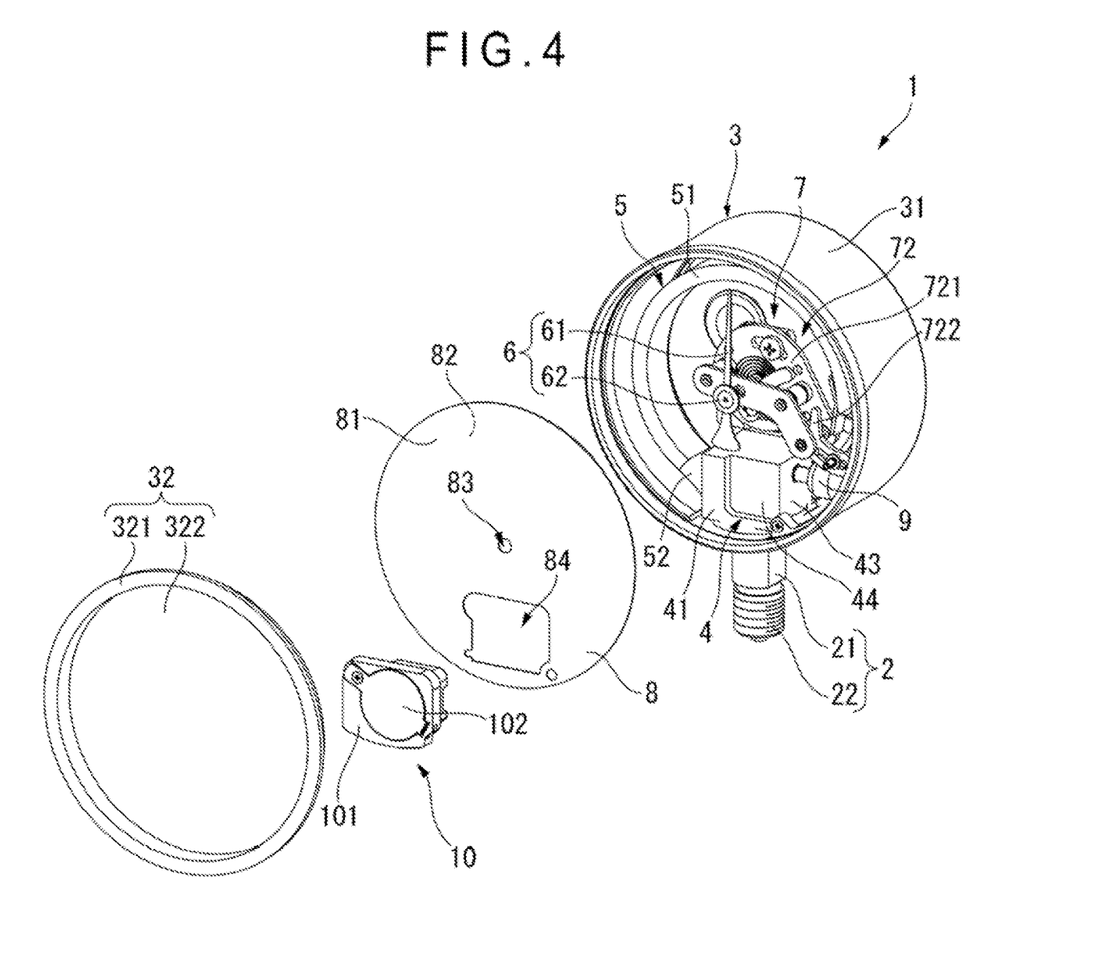
FIG. 4 is an exploded perspective view of the overall configuration of the inner structure of the pressure gauge.

FIG. 1 is a perspective view of an overall configuration of the pressure gauge 1 according to the exemplary embodiment. FIG. 2 is a front view of an overall configuration of an inner structure of the pressure gauge 1. FIG. 3 is a side cross-sectional view of the overall configuration of the inner structure of the pressure gauge 1. FIG. 4 is an exploded perspective view of the overall configuration of the inner structure of the pressure gauge 1.

As shown in FIG. 1 to FIG. 4, the pressure gauge 1 includes an introduction member 2, a case 3, a connection member 4, a bourdon tube 5, a pointer 6, a pointer transfer mechanism 7, a dial plate 8, a detector 9, and an information communication unit 10. The pressure gauge 1 of the exemplary embodiment is thus configured as a bourdon-tube pressure gauge.

Introduction Member 2

The introduction member 2, which is a so-called joint member attachable to a to-be-attached target such as a pipe (not shown), is in a form of a metal member of brass, stainless steel, iron and steel, or the like. The introduction member 2 includes a body 21 and a male thread 22 provided at a distal end portion of the body 21.

A fluid introduction hole 211, through which a to-be-measured fluid is introduced from the to-be-attached target, is formed in the body 21. The male thread 22 is screwed to the to-be-attached target.

Case 3

The case 3 includes a case body 31 and a cover 32.

The case body 31, which is made of a metal, is in a form of a bottomed cylinder, and the connection member 4, the bourdon tube 5, the pointer 6, the pointer transfer mechanism 7, the dial plate 8, the detector 9, and the information communication unit 10 are housed therein.

The cover 32, which is disposed to cover an opening of the case body 31, is removably attachable to the case body 31. Further, the cover 32 includes a cylindrical cover body 321 and a disc-shaped transparent plate 322 attached to an opening of the cover body 321. A user can thus see the pointer 6 and the dial plate 8, which are housed in the case 3, through the transparent plate 322.

Connection Member 4

The connection member 4, which is made of a metal, is a member configured to connect the introduction member 2 to each of the bourdon tube 5 and the detector 9. The connection member 4 includes a connection member body 41 and an attachment plate 46. Further, the connection member body 41 is formed integral with the introduction member 2 in the exemplary embodiment. It should be noted that the configuration of the connection member body 41 is not limited to the above and, for instance, may be formed independent of the introduction member 2.

The connection member body 41, which is in a form of a block, has a first attachment side surface 42, a second attachment side surface 43, and a step 44. A fluid flow hole 45 is formed in the connection member body 41.

The first attachment side surface 42 is a surface of the connection member body 41 disposed along a direction orthogonal to the dial plate 8. The bourdon tube 5 is attached to the first attachment side surface 42 of the connection member body 41.

The second attachment side surface 43 is a surface of the connection member body 41 disposed along the direction orthogonal to the dial plate 8 and opposite the first attachment side surface 42. The detector 9 is attached to the second attachment side surface 43 of the connection member body 41. In other words, the detector 9 and the bourdon tube 5 are opposed to each other with the connection member body 41 interposed therebetween in the exemplary embodiment.

Further, the detector 9 is disposed at a position where the detector 9 does not interfere with the pointer transfer mechanism 7 as seen from the direction orthogonal to the dial plate 8 in the exemplary embodiment.

The step 44 is provided to a front surface of the connection member body 41, that is, a surface facing the dial plate 8. In the exemplary embodiment, the step 44 is formed to fit a shape of a unit body 101 of the later-described information communication unit 10.

The fluid flow hole 45 is in communication with the fluid introduction hole 211 of the introduction member 2. Further, the fluid flow hole 45 is connected to a bourdon tube connector 52 of the later-described bourdon tube 5. The to-be-measured fluid is thus introduced into the bourdon tube 5 through the fluid introduction hole 211 and the fluid flow hole 45. Further, a communication tube 92 of the later-described detector 9 is connected to the fluid flow hole 45. The to-be-measured fluid is thus introduced into the detector 9 through the fluid introduction hole 211 and the fluid flow hole 45.

The attachment plate 46, which is in an L-shape in a side cross-sectional view shown in FIG. 3, fixes a support plate 721 of the later-described pointer transfer mechanism 7 to the case body 31.

It should be noted that, although the connection member body 41 and the attachment plate 46 are independent of each other in the exemplary embodiment, this configuration is not exhaustive and the connection member body and the attachment plate may be integral with each other.

Bourdon Tube 5

The bourdon tube 5, which is made of a metal, has a distal end portion displaceable according to a pressure of the to-be-measured fluid introduced therein. The pressure gauge 1 of the exemplary embodiment is configured to measure the pressure of the to-be-measured fluid by transferring a displacement of the bourdon tube 5 to the pointer 6 via the pointer transfer mechanism 7. The bourdon tube 5 includes a bourdon tube body 51 and the bourdon tube connector 52.

The bourdon tube body 51 is formed in a semicircular shape in a plan view seen from the direction orthogonal to the dial plate 8. The distal end portion of the bourdon tube body 51 is displaceable according to the pressure of the to-be-measured fluid introduced therein. A fluid hole 511 for flowing the introduced to-be-measured fluid therein is formed in the bourdon tube body 51.

The bourdon tube connector 52 is a member configured to connect the connection member 4 and the bourdon tube body 51 to each other. As described above, the bourdon tube connector 52 is attached to the second attachment side surface 43 of the connection member body 41 and is in communication with the fluid flow hole 45.

Pointer 6

The pointer 6, which is a member configured to indicate the pressure of the to-be-measured fluid detected by the bourdon tube 5, includes a pointer body 61 and a shaft 62.

The pointer body 61 is configured to rotate around the shaft 62 (i.e., a rotation shaft), thereby pointing to a scale (not shown) displayed on the dial plate 8 according to the pressure of the to-be-measured fluid detected by the bourdon tube 5.

The shaft 62 penetrates through a shaft insertion hole 83 formed at a center portion of the dial plate 8 while being connected to the pointer transfer mechanism 7. With this configuration, the displacement of the distal end portion of the bourdon tube body 51 according to the pressure of the to-be-measured fluid can be transferred to the pointer body 61 via the pointer transfer mechanism 7.

Pointer Transfer Mechanism 7

The pointer transfer mechanism 7, which is configured to amplify the displacement of the distal end portion of the bourdon tube body 51 and transfer the displacement to the pointer 6, includes a connector 71 and an internal device 72.

The connector 71 is a member configured to connect the distal end portion of the bourdon tube body 51 to the internal device 72.

The internal device 72, which is configured to transfer the displacement of the distal end portion of the bourdon tube body 51 to the pointer 6, includes the support plate 721, a sector 722, and a rod 723.

The support plate 721 is a member configured to support the sector 722 and the shaft 62 of the above-described pointer 6. The support plate 721 is attached to the case body 31 via the attachment plate 46.

The sector 722 is a member configured to transfer the displacement of the distal end portion of the bourdon tube body 51 to the shaft 62 through the connector 71 and the rod 723. The sector 722 is rotatably supported by the above-described support plate 721.

The rod 723, which is a member configured to connect the connector 71 to the sector 722, is rotatably supported by the connector 71.

Dial Plate 8

The dial plate 8, which is disposed so as to face the transparent plate 322 of the cover 32, has a front surface 81 displaying the scale (not shown). Thus, the pressure gauge 1 can display the pressure of the to-be-measured fluid by the pointer body 61 pointing to the scale.

Further, the dial plate 8 has a shaft insertion hole 83 and a through hole 84 each penetrating the dial plate 8 from the front surface 81 to the rear surface 82. The unit body 101 of the later-described information communication unit 10 is inserted in the through hole 84.

Detector 9

The detector 9 is a member configured to detect the pressure of the to-be-measured fluid and output a signal corresponding to the detected pressure. The detector 9, which is made of a metal, includes a sensor element 91 and the communication tube 92. It should be noted that the detector 9 is attached directly to the connection member 4 in the exemplary embodiment.

The sensor element 91 includes a diaphragm 911 and a cylindrical portion 912. The diaphragm 911 is configured to be deformed according to the pressure of the introduced to-be-measured fluid. The cylindrical portion 912 supports the diaphragm 911 at one distal end portion thereof. The other end portion of the cylindrical portion 912 is connected to the communication tube 92. With this configuration, the to-be-measured fluid is introduced into the cylindrical portion 912 through the communication tube 92. Further, a strain gauge (not shown) configured to detect a deformation of the diaphragm 911 is disposed in the diaphragm 911. The sensor element 91 is thus configured to output the signal corresponding to the pressure of the to-be-measured. In other words, the sensor element 91 is configured as a strain-gauge pressure sensor element in the exemplary embodiment. It should be noted that the configuration of the sensor element 91 is not limited to the above, and the sensor element 91 may be configured as, for instance, a capacitive pressure sensor element. It is only required that the sensor element 91 detects the pressure of the to-be-measured fluid.

The communication tube 92 is welded to the second attachment side surface 43 of the connection member body 41. One end of the communication tube 92 is in communication with the fluid flow hole 45 as described above. The other end of the communication tube 92 is bonded to the sensor element 91. With this configuration, the communication tube 92 can introduce the to-be-measured fluid flowing through the fluid flow hole 45 into the sensor element 91.

Further, the communication tube 92 and the second attachment side surface 43 of the connection member body 41 are laser-welded to each other in the exemplary embodiment. Since a focal length between a torch of a welding device and a welded point can be adjusted in the laser welding, interference between the torch and the bourdon tube 5 can be restrained during a welding operation. Further, since the laser welding enables local heating and further the sensor element 91 is connected to the connection member body 41 through the communication tube 92, heat at the welding can be restrained from being transferred to the sensor element 91.

Information Communication Unit 10

Figure 5:
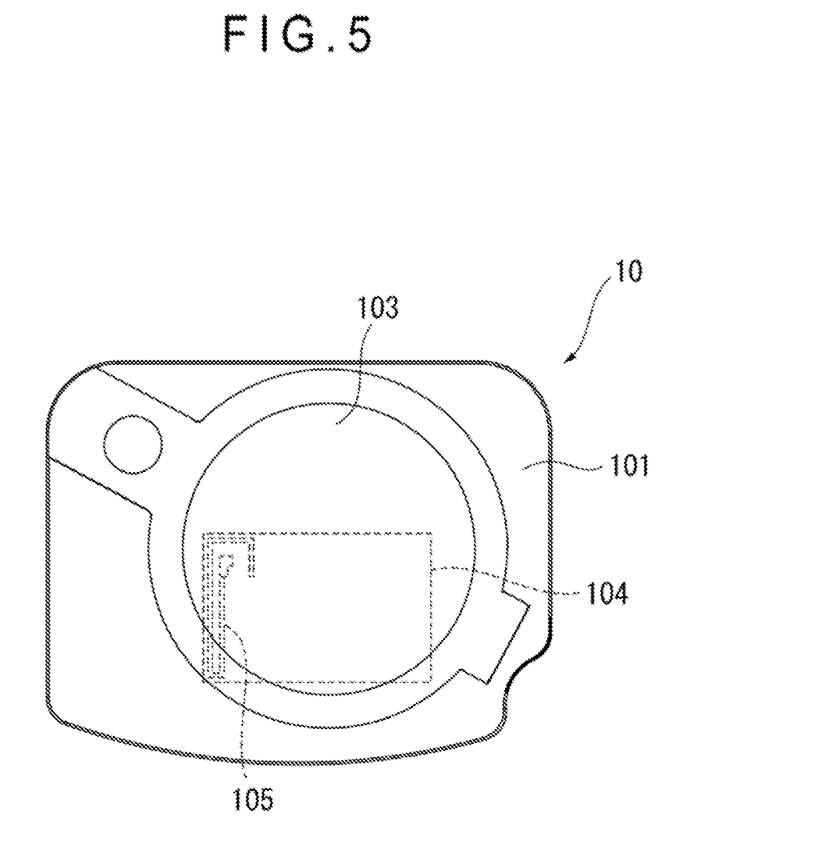
FIG. 5 is a front view of an overall configuration of an inner structure of an information communication unit.

FIG. 5 is a front view of an overall configuration of an inner structure of the information communication unit 10. It should be noted that FIG. 5 shows a state where a lid 102 is removed.

As shown in FIG. 1 to FIG. 5, the information communication unit 10 includes the unit body 101, the lid 102, a battery 103, a circuit board 104, and an antenna 105.

Further, in the exemplary embodiment, the information communication unit 10 is configured to send and receive an electric wave of Bluetooth (Registered trademark). The information communication unit 10 can thus output a signal outputted from the sensor element 91 to an external device. It should be noted that the configuration of the information communication unit 10 is not limited to the above and may be configured to send and receive, for instance, an electric wave or an infrared light of Wi-Fi (Registered trademark) or NFC.

Further, the circuit board 104 may include a storage. Such a configuration enables the circuit board 104 to, for instance, store data corresponding to the signal outputted from the sensor element 91 and, when predetermined data is stored, output the data through the antenna 105.

The unit body 101, which is in a form of a resin-made bottomed cylinder, is inserted in the through hole 84 of the dial plate 8 as described above. The unit body 101 is thus disposed astride between the front surface 81 and the rear surface 82 of the dial plate 8. Further, the unit body 101 is disposed in the step 44 of the connection member body 41 in the exemplary embodiment.

The lid 102, which is removably attachable to the unit body 101, is disposed to cover an opening of the unit body 101. Further, the lid 102 is disposed on a side of the unit body 101 close to the front surface 81 of the dial plate 8 such that the lid 102 faces the transparent plate 322 of the cover 32. Thus, it is only necessary to remove the case body 31 from the cover 32 to attach or remove the lid 102 to or from the unit body 101.

The single battery 103, which is installed in the unit body 101, is configured to supply power to the circuit board 104. In the exemplary embodiment, the battery 103 is a so-called button battery or coin battery. It should be noted that the configuration of the battery 103 is not limited to the above and may be configured as, for instance, a cylindrical dry cell, a cylindrical rechargeable battery, or a polymer battery. Further, a plurality of batteries 103 may be installed in the unit body 101.

The circuit board 104, on which an electronic component, etc. (not shown) are mounted, is electrically connected to the sensor element 91 of the detector 9. With this configuration, the signal outputted from the sensor element 91 can be inputted to the circuit board 104.

Further, the circuit board 104 is built in the unit body 101 behind the battery 103, that is, on a side of the battery 103 facing the connection member 4. In other words, the battery 103 is disposed between the lid 102 and the circuit board 104.

In addition, the circuit board 104 is provided with the antenna 105 configured as a pattern antenna. The circuit board 104 can thus send and receive an electric wave to and from an external device through the antenna 105. For instance, the circuit board 104 can output the signal inputted from the sensor element 91 to the external device through the antenna 105. Further, a signal from the external device, such as a signal for adjusting output of the circuit board 104, can be inputted to the circuit board 104 through the antenna 105.

It should be noted that the configuration of the antenna 105 is not limited to the above and the antenna 105 may be configured as, for instance, a dipole antenna or a chip antenna.

In this regard, the antenna 105 is disposed at a position where at least a part of the antenna 105 is not overlaid with the battery 103 as seen from the direction orthogonal to the dial plate 8 in the exemplary embodiment. With this configuration, in sending or receiving an electric wave to or from an external device through the antenna 105, the battery 103 is not disposed at least at a part of an electric wave transmission path. This allows for restraining interference of the battery 103 with the electric wave to improve a sending/receiving sensitivity of the antenna 105 to the electric wave.

The exemplary embodiment as described above can achieve the following effects.

(1) In the exemplary embodiment, the battery 103 is disposed in the information communication unit 10 between the lid 102 and the circuit board 104. Further, the information communication unit 10 is inserted in the through hole 84 of the dial plate 8 to lie astride between the front surface 81 and the rear surface 82 of the dial plate 8 and the lid 102 is disposed on the side of the unit body close to the front surface 81 of the dial plate 8. This eliminates the necessity of removing the dial plate 8, the pointer 6, the pointer transfer mechanism 7, etc. in order to replace the battery 103, so that the replacement of the battery 103 can be facilitated.

(2) in the exemplary embodiment, the lid 102 is disposed so as to face the cover 32. It is only necessary to remove the cover 32 from the case body 31 and remove the lid 102 from the unit body 101 to replace the battery 103. Therefore, the replacement of the battery 103 can be facilitated.

(3) In the exemplary embodiment, in sending or receiving an electric wave to or from an external device through the antenna 105, the battery 103 is not disposed at least at a part of an electric wave transmission path. With this configuration, since interference with the electric wave by the battery 103 can be restrained, a sending/receiving sensitivity of the antenna 105 to the electric wave can be improved.

(4) In the exemplary embodiment, since the unit body 101 can be housed in the step 44 of the connection member 4, an inner space of the case 3 can be effectively used. Therefore, the case 3 can be reduced in size.

(5) In the exemplary embodiment, the detector 9 including the sensor element 91 is attached directly to the connection member 4. Accordingly, since it is not necessary to provide, for instance, a housing portion for housing the detector 9, the inner space of the case 3 is effectively used. In addition, with the detector 9 being attached to the second attachment side surface 43 provided opposite the first attachment side surface 42 to which the bourdon tube 5 is attached, a space where the bourdon tube 5 is not disposed within the case 3 can be effectively used. Therefore, the case 3 can be reduced in size.

(6) In the exemplary embodiment, the communication tube 92 is bonded to the connection member 4 and the sensor element 91 is in communication with the connection member 4 through the communication tube 92. A bonding point between the communication tube 92 and the connection member 4 can thus be distant from the sensor element 91 to restrain heat of welding for bonding the communication tube 92 to the connection member 4 from being transferred to the sensor element 91. Therefore, an influence of the welding on the sensor element 91 can be reduced.

(7) In the exemplary embodiment, the detector 9 is disposed at a position where the detector 9 does not interfere with the pointer transfer mechanism 7. Therefore, the inner space of the case 3 can be effectively used and the case 3 can be reduced in size.

Modifications

It should be noted that the scope of the invention is not limited to the above exemplary embodiment, and modifications, improvements, etc. fall within the scope of the invention as long as an object of the invention can be achieved.

In the above exemplary embodiment, the introduction member 2 includes the male thread 22 but the configuration of the introduction member 2 is not limited thereto. For instance, the introduction member may include a female thread or may be welded to a to-be-attached target.

In the above exemplary embodiment, the case body 31 is made of a metal but a material of the case body 31 is not limited thereto. For instance, the case body may be made of a resin.

Further, in the above exemplary embodiment, the case body 31 is in the form of a bottomed cylinder but the case body 31 may be in any form. For instance, the case body may be a bottomed rectangular prism or only has to be configured to allow the connection member, the bourdon tube, the pointer, the pointer transfer mechanism, the dial plate, the detector, the information communication unit, etc. to be housed therein.

In the above exemplary embodiment, the antenna 105 is disposed at a position where at least a part of the antenna 105 is not overlaid with the battery 103 as seen from the direction orthogonal to the dial plate 8, but the antenna 105 may be at any position. For instance, the antenna may be disposed at a position where the antenna is not overlaid with the battery at all as seen from the direction orthogonal to the dial plate. In addition, a case where the antenna is fully overlaid with the battery also falls within the scope of the invention.

Further, in the above exemplary embodiment, the connection member 4 has the step 44 to fit a shape of the unit body 101 but the configuration of the connection member 4 is not limited thereto. For instance, a case where the connection member is provided with no step also falls within the scope of the invention.

Figure 6:
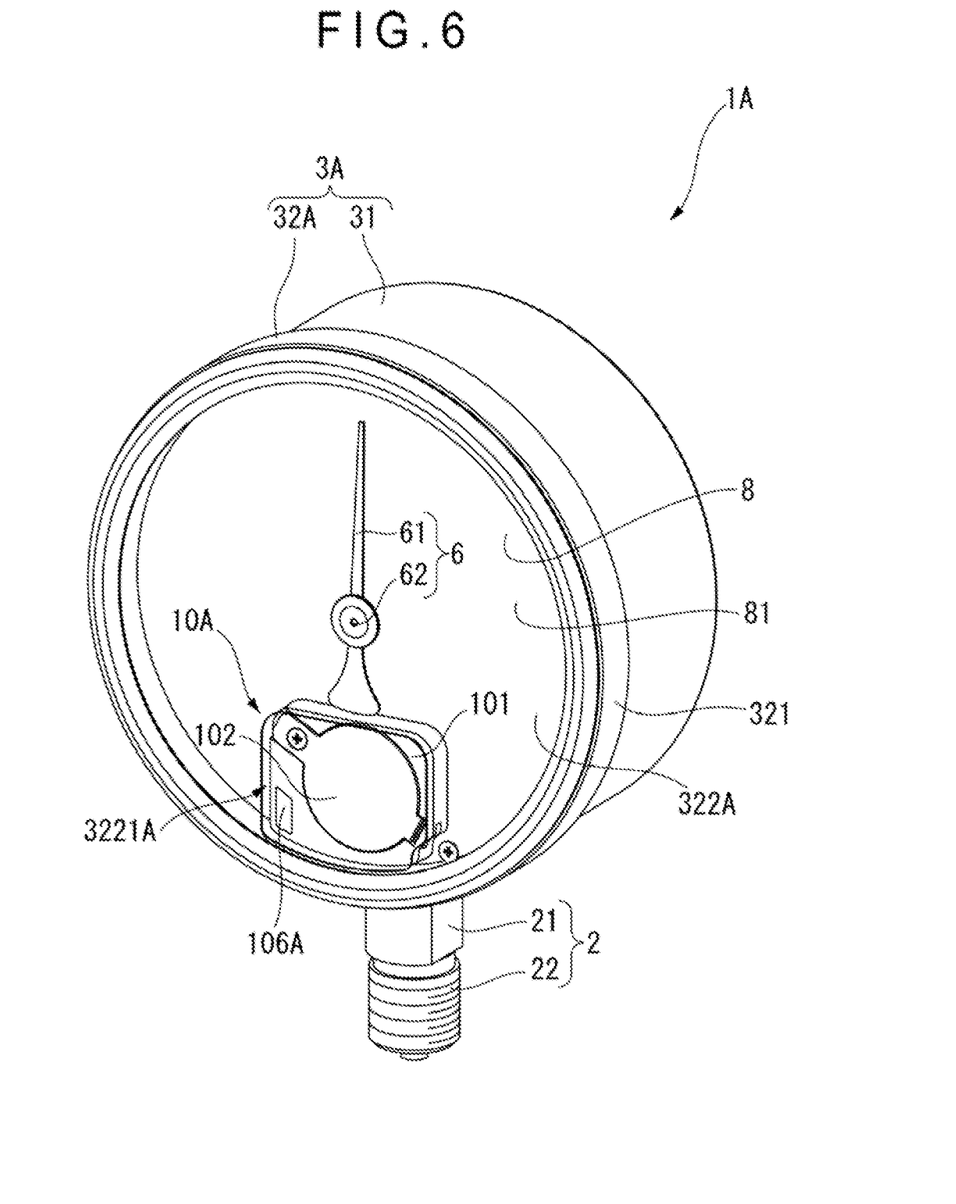
FIG. 6 is a perspective view of an overall configuration of a pressure gauge according to a modification.

FIG. 6 is a perspective view of an overall configuration of a pressure gauge 1A according to a modification.

As shown in FIG. 6, a transparent plate 322A of a cover 32A of a case 3A may be provided with a hole 3221A at a position corresponding to an information communication unit 10A.

In such a configuration, the lid 102 can be removed through the hole 3221A without the necessity of removing the cover 32A, so that a battery installed in the information communication unit 10A can be easily replaced.

Further, as shown in FIG. 6, the information communication unit 10A may be provided with a communication port 106A. In such a configuration, with a cable or a recording medium being connected to the communication port 106A, communication with an external device can be performed through the cable or the recording medium. In this case, the circuit board may be provided with no antenna.

Figure 7:
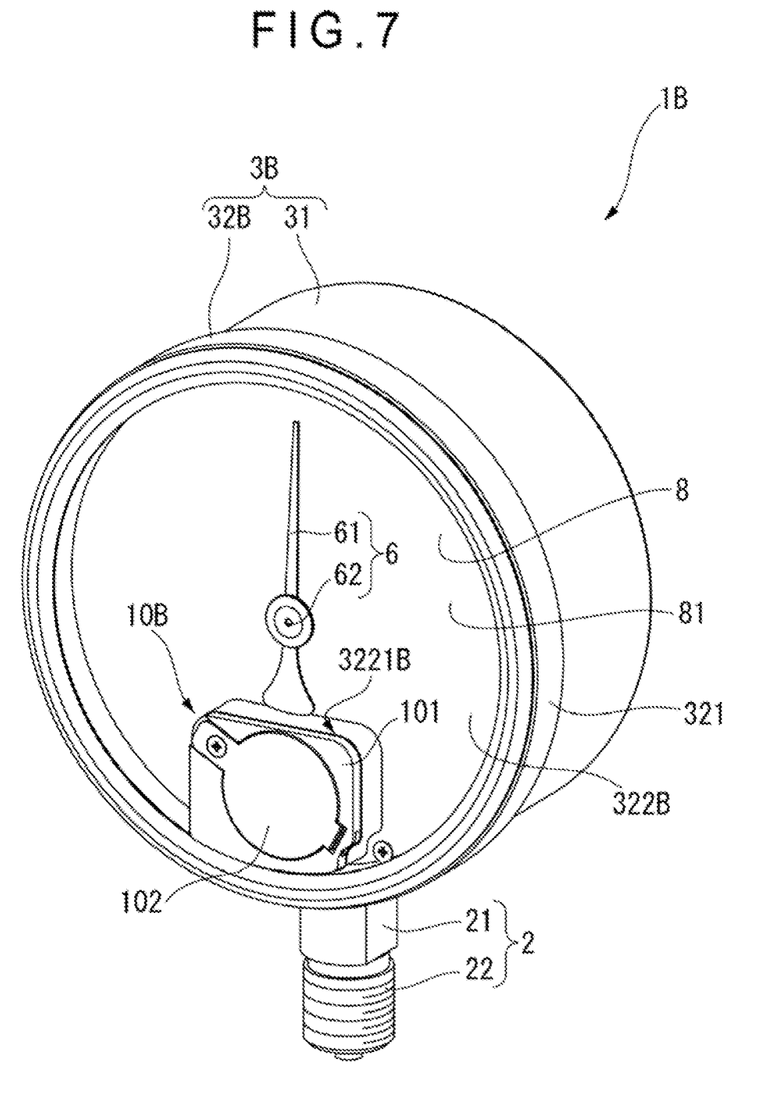
FIG. 7 is a perspective view of an overall configuration of a pressure gauge according to another modification.

FIG. 7 is a perspective view of an overall configuration of a pressure gauge 1B according to another modification.

As shown in FIG. 7, a transparent plate 322B of a cover 32B may be provided with a hole 3221B and an information communication unit 10B may be disposed such that the information communication unit 10B partially projects outside a case 3B through the hole 3221B. In this case, since the lid 102 is disposed to an external side of the case 3B and can be removed without removing the cover 32B, a battery installed in the information communication unit 10B can be easily replaced.

What is claimed is:

1. A pressure gauge comprising:
an introduction member having a fluid introduction hole into which a to-be-measured fluid is introduced;
a connection member having a fluid flow hole being in communication with the fluid introduction hole;
a bourdon tube attached to the connection member and being in communication with the fluid flow hole;
a pointer configured to rotate in conjunction with a displacement of a distal end portion of the bourdon tube;
a dial plate having a front surface on which a scale to be pointed by the pointer is displayed and having a through hole penetrating from the front surface to a rear surface;
a detector configured to detect a pressure of the to-be-measured fluid and attached to the connection member; and
an information communication unit in which a circuit board electrically connected to the detector and a battery are installed, the information communication unit comprising a bottomed cylindrical unit body and a lid covering an opening of the unit body, wherein
the battery is disposed between the circuit board and the lid,
the information communication unit is inserted in the through hole to be disposed astride between the front surface and the rear surface of the dial plate, and
the lid is disposed on a side of the unit body close to the front surface of the dial plate.

2. The pressure gauge according to claim 1, further comprising:
a case comprising a bottomed cylindrical case body and a cover covering an opening of the case body, the case housing therein the connection member, the bourdon tube, the pointer, the dial plate, the detector, and the information communication unit, wherein
the lid is disposed facing the cover.

3. The pressure gauge according to claim 1, further comprising:
a case comprising a bottomed cylindrical case body and a cover covering an opening of the case body, the case housing therein the connection member, the bourdon tube, the pointer, the dial plate, the detector, and the information communication unit, wherein
the cover has a hole at a position corresponding to the information communication unit.

4. The pressure gauge according to claim 3, wherein
the information communication unit is disposed in a manner to partially project outside the case through the hole, and
the lid is disposed on an external side of the case.

5. The pressure gauge according to claim 1, wherein
the information communication unit further comprises an antenna provided at the circuit board, and
the antenna is disposed at a position where at least a part of the antenna is not overlaid with the battery as seen from a direction orthogonal to the dial plate.

6. The pressure gauge according to claim 1, wherein
the connection member comprises a step to fit a shape of the unit body.

7. The pressure gauge according to claim 1, wherein
the connection member is in a form of a block and has a first attachment side surface disposed along a direction orthogonal to the dial plate and a second attachment side surface disposed along the direction orthogonal to the dial plate and opposite the first attachment side surface,
the bourdon tube is attached to the first attachment side surface of the connection member, and
the detector is attached to the second attachment side surface of the connection member.

8. The pressure gauge according to claim 7, wherein
the detector comprises a sensor element configured to detect the pressure of the to-be-measured fluid and a communication tube through which the sensor element and the fluid flow hole are in communication with each other,
the connection member and the communication tube are each made of a metal, and
the communication tube and the second attachment side surface are welded to each other.

9. The pressure gauge according to claim 1, further comprising:
a pointer transfer mechanism configured to transfer the displacement of the distal end portion of the bourdon tube to the pointer, wherein
the detector is disposed at a position where the detector does not interfere with the pointer transfer mechanism.

* * * * *